United States Patent [19]

Smith

[11] Patent Number: 5,423,565
[45] Date of Patent: Jun. 13, 1995

[54] MOWER HITCH FOR LAWN TRACTOR

[76] Inventor: Frederick Smith, 458 Random Rd., Ripley, W. Va. 25271

[21] Appl. No.: 257,671

[22] Filed: Jun. 8, 1994

[51] Int. Cl.⁶ .............................................. B60D 1/14
[52] U.S. Cl. .................. 280/411.1; 280/492; 56/6; 56/15.9; 172/313; 172/624
[58] Field of Search ...................... 280/411.1, 412, 413, 280/456.1, 457, 492, 493, 494, 504; 56/6, 14.9, 15.7, 15.8, 15.9; 172/310, 313, 459, 624, 677

[56] References Cited

U.S. PATENT DOCUMENTS

| | | | |
|---|---|---|---|
| 1,582,947 | 5/1926 | Wagner et al. | 280/412 |
| 2,153,876 | 4/1939 | Roseman | 280/412 |
| 2,552,885 | 5/1951 | Claud-Mantle | 280/493 |
| 3,135,079 | 6/1964 | Dunn | 56/6 |
| 3,514,126 | 5/1970 | Fuss | 280/411.1 |
| 3,608,284 | 9/1971 | Erdman | 56/6 |
| 3,757,500 | 9/1973 | Averitt | 56/6 |
| 3,832,834 | 9/1974 | Kovacs | 56/6 |
| 4,063,748 | 12/1977 | Schmidt | 56/6 X |
| 4,711,461 | 12/1987 | Fromberg | 280/494 |
| 4,744,580 | 5/1988 | Ryan | 280/411.1 |
| 4,815,259 | 3/1989 | Scott | 56/6 |
| 4,896,485 | 1/1990 | Gordy | 56/6 |
| 5,167,423 | 12/1992 | Hall, Jr. | 280/483 X |

Primary Examiner—Eric D. Culbreth
Assistant Examiner—Victor E. Johnson

[57] ABSTRACT

A hitch attaches to a lawn tractor and draws two lawn mowers therebehind. The hitch includes a draw bar solidly mounted to the tractor, and a link for each towed mower, which mowers each include a bracket to the deck thereof. The links include plumbing tees perpendicularly arranged, so that universal joints are formed between the draw bar and the mowers. A third tee is provided at each bracket so that each mower may be individually tilted, as for enabling access to the underside while still ganged to the hitch. The draw bar, links, and third tee are made from readily available plumbing components. The resultant hitch is thus fabricated from readily available components, is durable, uncomplicated, and has wide flexibility in allowing for various attitudes of the mowers. This enables individual mowers to follow the contour of uneven terrain, turn in tight quarters while being towed, and to be temporarily tilted for access to the cutting blade and oil drain cock without requiring disassembly from the hitch.

7 Claims, 2 Drawing Sheets

MOWER HITCH FOR LAWN TRACTOR

BACKGROUND OF THE INVENTION

1. Field of the Invention

The present invention relates to a hitch for pulling powered lawn mowers behind a lawn tractor.

2. Description of the Prior Art

The prior art has long recognized the desirability of ganging together a plurality of pushed mower units, and drawing the same behind a tractor or the like. A lawn is more quickly mowed by operating several mowers simultaneously. Also, it is much easier to ride on a powered tractor than to push one or more mowers without powered assistance.

Small tractors have been developed for this purpose, as well as to draw small loads, compared to commercial farming. It would be relatively easy to connect a group of mower units which were originally intended to be individually operated in order to achieve the practical grouping described above. Accordingly, hitches for mounting to a tractor and to two or more mower units have been proposed, and several examples will be discussed.

Tow hitches for pulling two powered push mowers behind a lawn tractor are seen in U.S. Pat. Nos. 1,582,947, issued to Hayden W. Wagner et al. on May 4, 1926; 3,514,126, issued to William H. Fuss on May 26, 1970; and 4,744,580, issued to Charles C. Ryan on May 17, 1988. In the first example, a draw bar is pivotally mounted to the tractor, which in this example has an integral first power mower unit. The draw bar attaches to the frames of the two drawn mowers by, at each point of attachment, a special joint incorporating one vertical and one horizontal pivot pin. The combination of pivoting about two orthogonal axes provides universally pivotal adjustment, and will hereinafter be termed a universal joint.

The draw bar of the second example is solidly mounted to the tractor. A bracket is solidly mounted to each mower, and a link connects each bracket to the draw bar. The link loosely fits the draw bar and the respective brackets, resultant play thus accommodating maneuvering, turning, and uneven ground.

In the device of Ryan '580, the draw bar comprises a solid unitary member. Each mower is attached thereto by a short chain anchored to the draw bar at a bolt. Another similar arrangement is described in U.S. Pat. No. 3,608,284, issued to Leon P. Erdman on Sep. 28, 1971. The mowers of Erdman '284 are not self-contained, pushed, power mowers, but are specially designed to cooperate with the tow hitch.

A hitch seen in U.S. Pat. No. 3,757,500, issued to Marnie C. Averitt on Sep. 11, 1973, yokes two mowers abreast, behind a tractor. The mowers are adjustably spaced apart by telescoping members, but in other respects are solidly joined.

A ganged arrangement for drawing three push mowers behind a lawn tractor is disclosed in U.S. Pat. No. 4,815,259, issued to Wayne Scott on Mar. 28, 1989. A first hitch connects the tractor to a lead mower. Two additional mowers are connected to the lead mower by a second hitch. The first hitch is configured in a "T" shape, the stem of the T attaching to the lead mower, and the top of the T spanning and attaching to the front right and front left corners of the mower deck. The second hitch is configured generally in "U" form, the base of the U spanning and attaching to rear right and left corners of the mower deck, and the upright segments of the U connecting to the trailing mowers. The upright segments of the U terminate in tees, so as to attach to their respective mower units in the same manner as the lead mower is connected to the tractor.

U.S. Pat. No. 3,134,079, issued to Thomas J. Dunn on Jun. 2, 1964, discloses an apparatus incorporating three drawn mower units and a draft bar.

An asymmetric arrangement is seen in U.S. Pat. No. 3,832,834, issued to George E. Kovacs on Sep. 3, 1974. A draw bar attaches to two mowers, one located behind and to the side of the first. A partial frame holds the trailing mower in this orientation.

None of the above inventions and patents, taken either singly or in combination, is seen to describe the instant invention as claimed.

SUMMARY OF THE INVENTION

The present invention provides an uncomplicated hitch which is substantially formed from readily available plumbing components. A major advantage of employing this class of hardware is that such components are usually prethreaded, so that connection is readily performed with minimal requirement for welding, jigs, and other aids to assembly. Also, components are available in progressively larger sizes, so that loosely interfit parts are readily available prefabricated in operable condition. This is highly useful in journaled arrangements which will be described hereinafter. With some components used in the joints, some boring or machining will be required. For example, it may be advantageous to rethread some members to include bolt thread, rather than the tapered pipe thread originally provided by the manufacturer. This will likely be required when employing schedule 80 components, which standard is of sufficient strength to be employed in the novel invention, while withstanding the loads typically encountered.

The apparatus includes a draw bar comprising a pipe having right and left telescoping extensions, there being a plate welded to the pipe for future bolting by which the draw bar mounts solidly to the tractor. The two extensions each connect to a link joining one mower to the draw bar. Connection of a link to the draw bar and this link to its mower is provided by tee couplings rotatably engaging their respective extensions and mowers.

Each link has two tees threaded thereto, one fore and one aft. The forward tee rotatably engages one of the aforementioned extensions, and the other tee similarly engages a rod mounted to the mower. The two tees associated with each respective link are arranged perpendicularly to one another, so that a universal joint is thus provided. The rear tee, which connects the link to the mower, includes stops limiting the angle between the tractor and the towed mowers to forty-five degrees to either the right or the left. This prevents excessive angles which would cause the mowers to skid on the ground, rather than rolling.

The present arrangement also provides the ability to back up, or operate in reverse, without causing the mowers to assume an inappropriate angle or to bind. For short distances, the mowers will remain aligned or oriented with the tractor so that a short reversing maneuver may be accomplished. Normal forward operation may then be resumed. No rigid connection is required to maintain control while operating in reverse.

Attachment at the mower decks is accomplished by bolting a bracket to the top surface of the mower deck. The rod mounted to the mower is so mounted by attachment to this bracket.

A third tee coupling enables this rod to pivot with respect to the mower deck, so that each mower can easily follow changing contours of the ground without scalping.

Another advantage of the present invention is that minor or incidental lateral contact with objects such as trees or fence posts is accommodated by a mower making this contact. The mower pivots around the obstacle, and mowing may proceed without stopping and disengaging the mower from the obstacle.

The combination of rotatable connections and the arrangement of stops described herein accommodates sharp turns and uneven terrain while towing mowers, while enabling the mowers to remain substantially parallel to the ground, and free from troublesome engagement of trees, posts, and the like. Thus, a mowing operation proceeds successfully in spite of obstacles requiring steering and other maneuvers.

Accordingly, it is a principal object of the invention to provide a hitch for a lawn tractor which connects to at least two power mowers.

A significant object of the invention is to design the hitch to be fabricated substantially from commonly available plumbing fittings and components.

It is another object of the invention to design the hitch to be readily assembled to and detached from associated power mowers.

It is a further object of the invention to provide a universal joint at the point of attachment to each towed power mower.

An additional object of the invention is to provide for adjustment of lateral spacing apart of towed power mowers.

It is again an object of the invention to enable tilting of an individual mower to follow ground contours without scalping.

It is a still further object of the invention to accommodate tight turns, uneven terrain, and incidental lateral contact with obstacles when towing mowers with the novel hitch.

A related object of the invention is to limit the angle between the tractor and the towed mowers to a maximum value, so that the towed mowers continue to roll across the ground, and do not skid on the ground, or otherwise disrupt successful operation.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
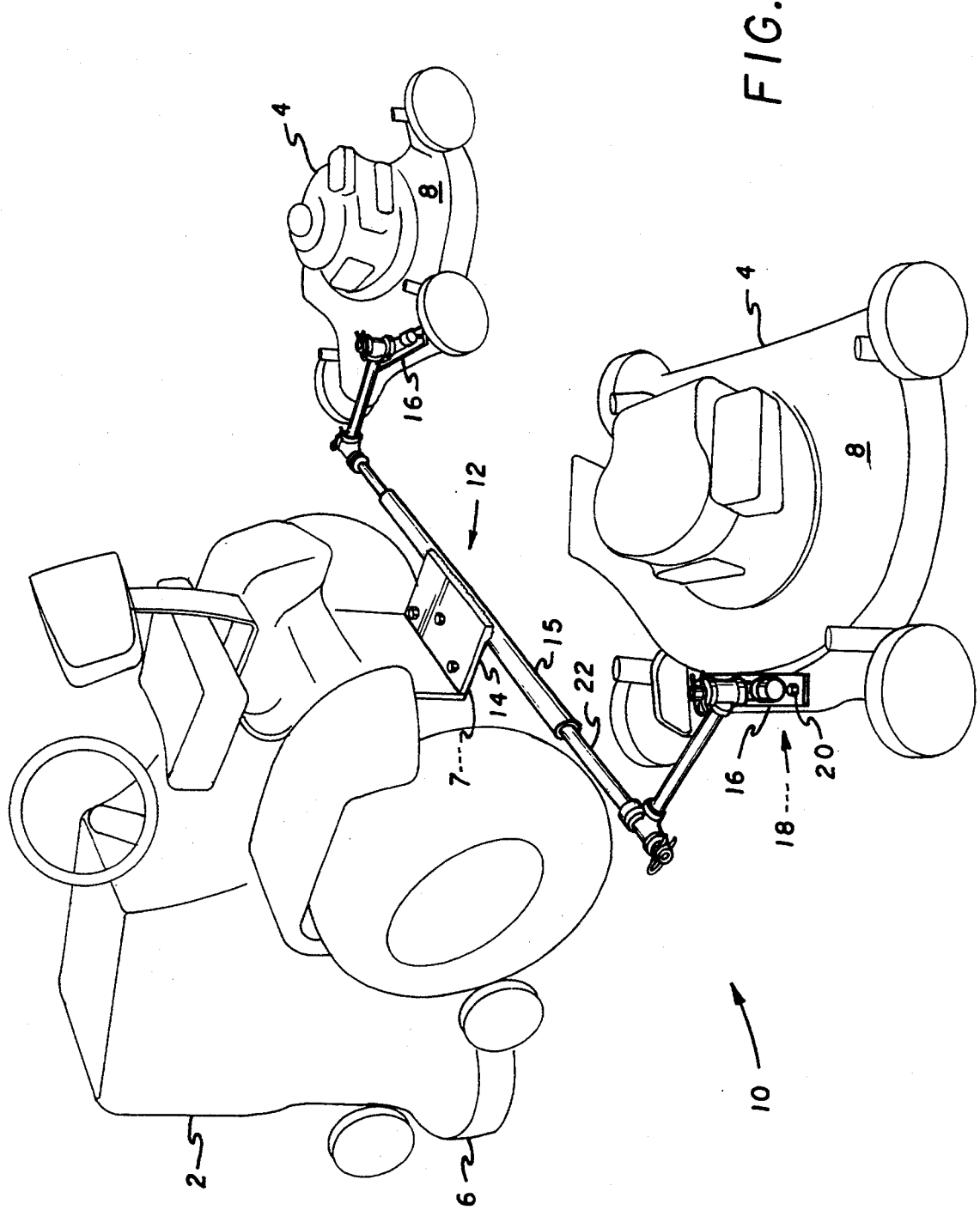
FIG. 1 is a perspective, environmental view of the invention, with certain stops omitted for clarity.

Turning now to FIG. 1 of the drawings, the novel hitch 10 is shown attached both to a lawn tractor 2 and to two trailing powered push mowers 4. Preferably, tractor 2 is of the type incorporating a mowing unit 6, so that only two trailing mowers 4 need be attached. The ensuing swath would be equivalent to combined swaths cut by three mowers arranged abreast, and this arrangement is considered the optimal combination of widest cut and most versatile or maneuverable formation as is practical for typical large lawns. A draw bar 12 is bolted at a plate 14 welded thereto to a corresponding plate 7 of tractor 2, so that draw bar 12 is solidly mounted to tractor 2. Mowers 4 are of the self-powered, manually pushed type. Handles (not shown) normally furnished with mowers 4 are preferably removed to improve ease of towing and conformity to ground contours, but may be left in place if desired.

Figure 2:
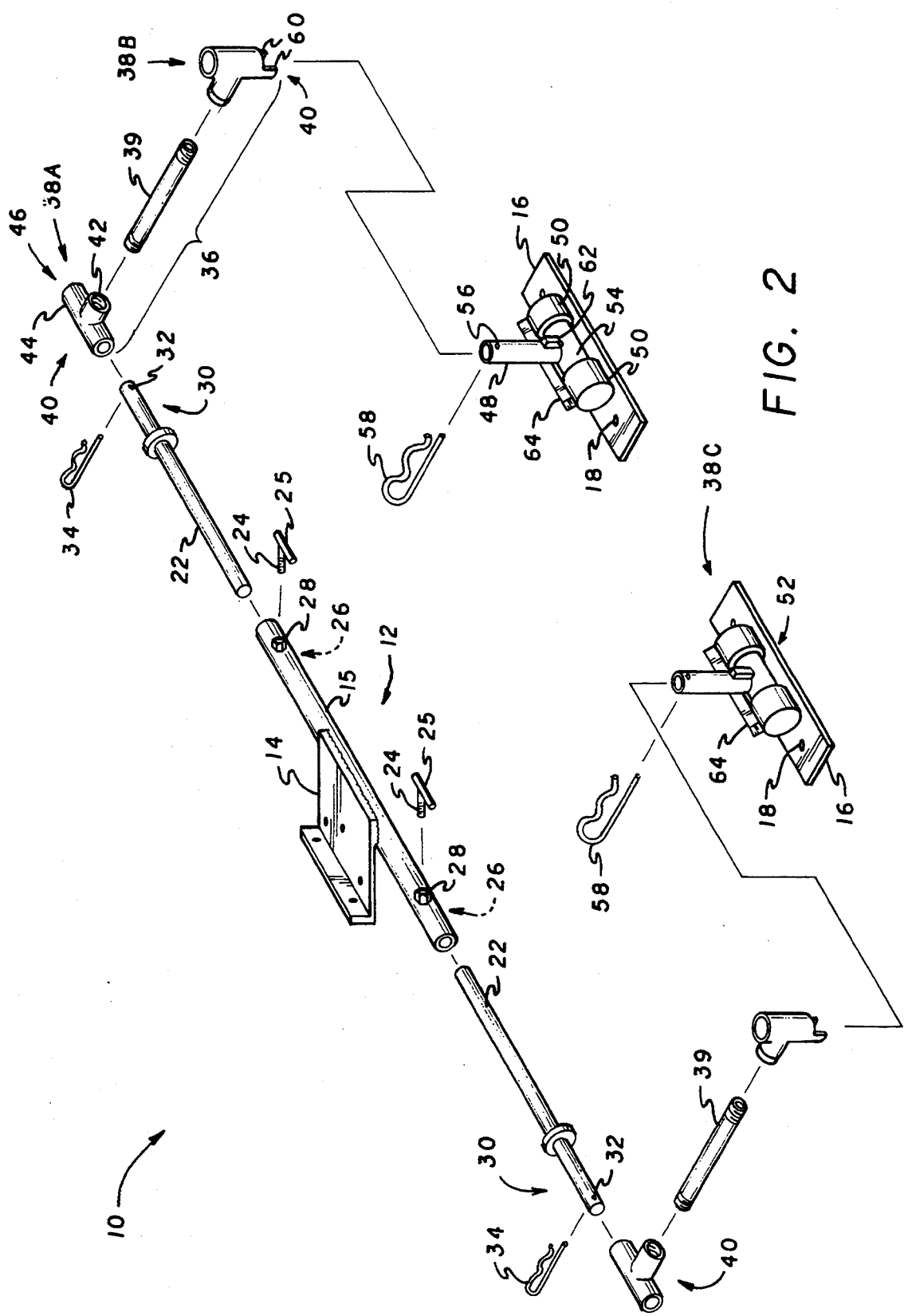
FIG. 2 is an exploded, perspective view of the invention which includes stops omitted in FIG. 1, drawn to enlarged scale.

FIG. 2 shows the components of hitch 10. A draw bar 12 comprises a central pipe 15 welded to a bracket 16. Bracket 16 has holes 18 accepting bolts 20 (see FIG. 1) for solid mounting to a tractor 2. Draw bar 12 is arranged horizontally and normal to the longitudinal axis of tractor 2. Span of draw bar 12 is adjustable due to telescoping draw bar extensions 22. Extensions 22 are locked at any desired span distance by setscrews 24, which engage central pipe 15 at threaded holes 26. Setscrews 24 have enlarged heads or tee handles 25, so that setscrews 24 are manually tightened and slackened. Holes 26 are conveniently provided by welding a nut 28 over a hole drilled in pipe 15.

At outer ends 30, each extension 22 has a bore 32 for receiving a retaining clip 34. Clip 34 is preferably of a type which is manually installed and removed, and is resilient rather than deformable, so that it may be reused.

Two links 36 connect push mowers 4 (see FIG. 1) to draw bar 12, there being one link 36 for each mower 4. Each link 36 pivotally attaches to draw bar 12 at a first tee coupling 38A, and extends rearwardly towards its associated mower 4. Each tee coupling 38A includes a tee 40 having a stem 42 and a cross bar 44 having a throughbore 46 defined therein. A second tee coupling 38B is provided at the rearward end of link 34. Throughbores 46 of tee couplings 38A and 38B are arranged normal to one another, thus providing a universal joint.

Each tee coupling 38A is rotatable relative to its associated tee coupling 38B. This accommodates roll, in the sense that the right side of a mower becomes raised or lowered in relation to the left side of that mower. Rotation is preferably provided by threading rod 39 loosely to a tee coupling 38A or 38B, and tightly to the other tee coupling 38B or 38A. This is best accomplished by employing bolt threading at the loose connection, and employing tapered pipe threading, turned to the point of being tight, at the other connection.

Each tee coupling 38A or 38B pivotally attaches to a rod to make a necessary connection. First tee coupling 38A supports one end 30 of an extension 22. In like manner, each second tee coupling 38B engages a stem 48 of a tee 52 attached to bracket 16.

Bracket 16 includes yokes 50 retaining tee 52, arranged so that crossbar 54 of tee 52 is arranged horizontally and laterally. The stem 48 of tee 52 is rotatably held in the tee 40 of second tee coupling 38B. Stem 48 extends beyond tee 40, so that a bore 56 is accommodated to accept retaining clip 58. The third tee coupling 38C thus formed at bracket 16 enables each mower 4 to assume a fairly steep angle with respect to tractor 2. This accommodates negotiation of minor dips in terrain.

Second tee couplings 38B differ from first tee couplings 38A in that a second tee coupling 38B includes projections 60 which cooperate with a corresponding projection 62 formed in tee 52. Normally, when tractor 2 is moving straight ahead, longitudinal axes of tractor 2 and mowers 4 are parallel. However, as tractor 2 turns to the right or left, a deviation from this parallel relation, or angle formed between these axes, may be said to exist. Projections 60 and 62 will abut and interfere when this deviation or angle exceeds forty-five degrees to either side of parallel alignment of the axes. This maximum allowed angle is shown in FIG. 1. Thus, stops are provided which limit maximal deviation, so that mowers 4 will roll across the ground rather than skidding.

A stop 64 is welded in place to bracket 16 or to yokes 50 as shown, to limit the angle of inclination or tilt of a mower 4. This arrangement provides a secondary constraint controlling mower 4 while maneuvering in reverse, should projections 60 or 62 break or otherwise become inoperative.

Pipe 15, extensions 22, tees 40 and 52, and the central pipe member of link 36 are all stock plumbing components which are readily available in cooperating and appropriate sizes to accomplish the purposes of the invention. Some dimensions may require modification from the original to ensure proper fit with other components, such as boring out internal bores of tees 40. Also, threading may be recut in some instances, illustratively in cases wherein a component is modified to include pipe thread at one place and bolt threads at another. Clips 34, nut 28, and stock material for forming plate 14, brackets 16 and tee handles 25 are all commonly available materials.

Thus, it will be appreciated that the above construction and features disclose a mower hitch which is substantially fabricated from readily available plumbing components and construction materials, and which is manually assembled, disassembled, and adjusted.

It is to be understood that the present invention is not limited to the sole embodiment described above, but encompasses any and all embodiments within the scope of the following claims.

I claim:

1. A hitch for drawing a plurality of power lawn mowers behind a lawn tractor having a longitudinal axis, said hitch comprising:
   a draw bar having tractor attachment means for solid attachment to the tractor, said draw bar arranged horizontally and normal to the longitudinal axis of the lawn tractor;
   a plurality of brackets having mower attachment means for solid attachment to respective lawn mowers, there being one said bracket attached to each lawn mower; and
   a plurality of links corresponding in number to the number of said brackets, attached to said draw bar, extending rearwardly therefrom, each said link connecting to one of the lawn mowers, each said link having a first tee coupling for attachment to said draw bar, a second tee coupling for attachment to said bracket, said first and second tee coupling of any one said link having throughbores oriented generally normal to one another, and a rod having two threaded ends, a first end of the rod having tapered threads and tightly threaded to one of said first and second tee couplings, a second end of the rod having bolt threads and loosely threaded to the other of said first and second tee couplings thus providing a universal joint, and whereby said draw bar is solidly mounted to the lawn tractor, said links universally and pivotally connect said draw bar to said brackets, and said brackets connect said links to the lawn mowers.

2. The hitch according to claim 1, each said bracket including a third tee coupling having a throughbore arranged horizontally, whereby an associated lawn mower deck may pivot horizontally with respect to said third tee.

3. The hitch according to claim 1, further including means for manually adjusting and locking the span of said draw bar.

4. The hitch according to claim 1, one of said first and second tee couplings having a vertical axis of rotation, there further being stops incorporated therein limiting pivot thereof to a maximal deviation of forty-five degrees from the tractor longitudinal axis.

5. The hitch according to claim 1, further including manually installed and removed fasteners for maintaining said links attached to said draw bar and to said brackets.

6. The hitch according to claim 1, each one of said brackets including a stop limiting tilt of an associated lawn mower.

7. A hitch for drawing a plurality of power lawn mowers behind a lawn tractor, said hitch comprising:
   a draw bar having tractor attachment means for solid attachment to the tractor, said draw bar arranged horizontally and normal to the longitudinal axis of the lawn tractor, and including means for adjusting and locking the span of the draw bar;
   a plurality of brackets having mower attachment means for solid attachment to respective lawn mowers; and
   a plurality of links corresponding in number to the number of said brackets, attached to said draw bar, extending rearwardly therefrom, each said link connecting to one of the lawn mowers, each said link having a first tee coupling for attachment to said draw bar, and a second tee coupling for attachment to said bracket, said first and second tee couplings of any one said link having throughbores oriented normal to one another, thus providing a universal joint, each of said second tee couplings having a vertical axis of rotation and having a notch forming two downwardly extending projections, there further being manually installed and removed fasteners for maintaining said links attached to said draw bar and to said brackets,
   each said bracket including a third tee coupling having a throughbore arranged horizontally and a vertical stem having a corresponding projection extending normal to said vertical axis cooperating with said downwardly extending projection thereby limiting pivot thereof to a maximal deviation of forty-five degrees from the tractor longitudinal axis, each one of said brackets including a second stop limiting tilt of an associated lawn mower, whereby said draw bar is solidly mounted to the lawn tractor, said links universally and pivotally connect said draw bar to said brackets, and said brackets connect said links to the lawn mowers.

* * * * *